(12) United States Patent
Sillery et al.

(10) Patent No.: US 8,596,940 B2
(45) Date of Patent: Dec. 3, 2013

(54) TRAILER AND METHOD FOR FIREWOOD DISTRIBUTION

(76) Inventors: Ross Sillery, Keewatin (CA); Laurene Manson-Sillery, Keewatin (CA)

(*) Notice: Subject to any disclaimer, the term of this patent is extended or adjusted under 35 U.S.C. 154(b) by 0 days.

(21) Appl. No.: 13/462,202

(22) Filed: May 2, 2012

(65) Prior Publication Data

US 2013/0294880 A1    Nov. 7, 2013

(51) Int. Cl.
*B60P 7/08* (2006.01)

(52) U.S. Cl.
USPC .......................................... 410/37

(58) Field of Classification Search
USPC ............ 410/31, 32, 36, 37, 42; 414/802, 930; 280/63
See application file for complete search history.

(56) References Cited

U.S. PATENT DOCUMENTS 3,458,215 A * 7/1969 Maradyn .................... 410/37

OTHER PUBLICATIONS

Business Branches Out, article, Edistone Llanfyllin, May, 2010, www.edistone.com/res/2.
Firewood Delivery Service, Edistone of Llanfyllin, http://web.archive.org/web/20090209124912/http://edistone.com/firewood_supply.html, Feb. 9, 2009.

* cited by examiner

*Primary Examiner* — Stephen Gordon
(74) *Attorney, Agent, or Firm* — Kyle R. Satterthwaite; Ryan W. Dupuis; Ade & Company Inc

(57) ABSTRACT

A firewood trailer features a roof-covered storage compartment dimensioned to accommodate a predetermined volume of cut firewood. At least one wall section of the compartment has a substantially full height access opening that is openable and closeable to access the compartment's interior, and arrays of airflow openings are provided in opposing wall sections of the compartment. Between the roof and the airflow openings, the firewood is allowed to dry out inside the trailer and subsequently kept dry by the roof protection. The same trailer can thus be used both to transport the cut firewood and then store the firewood at its destination, thereby avoiding the conventional need for a full unloading of the trailer upon reaching the firewood's destination. A fleet of trailers are used for a firewood distribution service in which a trailer left onsite for a customer, once emptied, is replaced with a newly delivered wood-filled trailer.

17 Claims, 2 Drawing Sheets

TRAILER AND METHOD FOR FIREWOOD DISTRIBUTION

FIELD OF THE INVENTION

The present invention relates generally to firewood distribution, and more particularly to delivering firewood to consumers using trailers that are pre-loaded with firewood and left on-site with the consumer for gradual unloading over time as consumption demands.

BACKGROUND OF THE INVENTION

Past practices for cutting firewood were not an easy task. Chains on chainsaws have to be regularly sharpened. It is substantially impossible to cut exact lengths of wood with a chainsaw, resulting in a pile of wood in different lengths which cannot be piled properly leaving doubt as to a consumer purchasing chainsaw-cut firewood as to whether they are receiving fair deal for the actual volume of wood being obtained.

Conventionally delivery of firewood to a consumer is labour intensive, requiring loading of the wood onto a delivery vehicle and subsequent unloading upon arrival at the destination specified by the consumer. When the wood is delivered, it may be left on the ground in full exposure to the weather, allowing it to get wet under rainfall or snow cover and leaving it to stay that way, resulting in a poor burn when finally consumed. The end result can be smoke in the house, creosote in the chimney causing chimney fires, and a mess on the ground to clean up. On top of all that, the repeated handling of the wood so many times makes the process costly for the customer and also inconvenient, as the customer doesn't need the mess and the work associated with a pile of wood.

There are fireplaces on the market that are efficient and cost effective in operation. With a supply of wood available at a fair price, without all the hassles of work and mess involved, people may start using their fireplaces more often. This would open up a market for a firewood product available in great quantities.

A mechanical machine employing hydraulic knives is already known for cutting and splitting wood to proper lengths, making the piling process fast, efficient and precise. Accordingly, an accurate 4 ft×4 ft×8 ft of wood can be produced without doubt as to its fair value.

The present invention provides firewood distribution equipment and methods to address at least some of the shortcomings of the prior art. These solutions provide labour-efficient distribution that contributes to accuracy in the delivered amount of firewood, especially when used with the aforementioned cutting and splitting machinery, to ensure consumer confidence in the purchase price, and provide convenient, dry and clean wood storage solutions for the consumer.

SUMMARY OF THE INVENTION

According to a first aspect of the invention there is provided a trailer for transporting and storing firewood comprising:

a frame having a towing end adapted for selective coupling to a towing vehicle;

wheels rotatably supported on the frame to engage ground below the frame and rollably support the frame during transport;

a storage compartment carried on the frame and comprising a floor extending along the frame, a front wall section projecting upward along a front end of the floor nearest the towing end of the frame, a rear wall section projecting upward along a rear end of the floor opposite the towing end of the frame, side wall sections extending between the front and rear wall sections along opposite sides of the floor, and a roof mounted over the wall sections to cover an interior space of the storage compartment over the floor between the wall sections;

at least one of the wall sections comprising an access portion spanning a substantially full height thereof from adjacent the floor to adjacent the roof and movable between open and closed positions to selectively open and close off access to the interior space at said at least one of the wall sections over the substantially full height thereof;

an array of airflow openings being provided in each wall section of at least one pair of opposing wall sections facing one another across the interior space of the storage compartment, each array of airflow openings comprising openings spaced over the substantially full height of said wall section and over a substantially full length of said wall section.

Intended for both firewood delivery and on-site wood storage once delivered to the consumer, the airflow openings in the trailer walls aid in drying out of the wood inside and the roof then keeps it dry, leaving an ideal firewood product delivered and maintained. The trailer can be towed to the consumer's requested site, and placed in a convenient location from which the customer can easily retrieve the wood as required for consumption. This gradual unloading of the wood over time avoids the labour time and cost of unloading by the delivery personnel, and also avoids the need for the customer to worry about providing shelter for the wood, which conventionally requires purchase, building or maintaining of a wood shed. When the trailer is empty, the delivery personnel are contacted, for example by phone call or email, so that they can come take the trailer and any residual mess away.

Preferably there is provided an additional array of airflow openings provided in the floor and spanning substantially from the front wall to the rear wall and substantially across the floor from one side wall section to the other.

Preferably the at least one pair of opposite wall sections comprises a first pair including the front and rear wall sections and a second pair including the side wall sections.

Preferably the roof comprises at least one non-horizontal section sloping downward moving outward relative to the interior space of the storage compartment.

Preferably the access portion comprises a sliding wall portion slidable along a respective side of the interior space of the storage compartment between the open and closed positions to respectively reveal and cover an access opening at the respective side.

Preferably the access portion comprises a series of sliding wall panels situated along a side of the interior space of the storage compartment and in which each sliding panel is slidable out of the closed position along an adjacent panel to increase an overlap of a first end of said panel with the adjacent panel to open the access to the interior space at a second end of said panel opposite the first end.

Preferably there are two panels in the series of sliding wall panels.

Preferably the series of sliding wall panels fully span the side of the interior space of the storage compartment when in the closed position.

Preferably each side wall section has a respective said access portion.

Preferably the side wall sections are longer than the front and rear wall sections.

A floor area of the interior space of the storage compartment spanning fully between the front and rear and side wall sections may be rectangular and measure approximately 8 feet by 4 feet.

A height of the interior space of the storage compartment may be at least 4 feet.

Preferably the trailer is provided in combination with a supply of firewood contained within the interior space of the storage compartment.

With the above dimensions the interior space of the storage compartment preferably contains a cord of firewood occupying a substantially full volume of the interior space of the storage compartment.

The storage compartment may be selectively detachable from the trailer frame and deployable from thereatop.

According to a second aspect of the invention there is provided a method of preparing firewood for distribution to a customer location, the method comprising:

providing a firewood trailer comprising a frame having a towing end adapted for selective coupling to a towing vehicle, wheels rotatably supported on the frame to engage ground below the frame and rollably support the frame during transport, and a storage compartment carried on the frame and dimensioned to contain a predetermined volume of stacked firewood between walls positioned apart by predetermined distances suitable to maintain a stacked configuration of the firewood once stacked within the storage compartment; and loading firewood pieces into the storage compartment and stacking said firewood pieces therein to fill the storage compartment to a level at which the firewood pieces form the predetermined volume of stacked firewood substantially filling an area bound by the walls of the storage compartment.

The firewood trailer preferably has selectively openable access areas at opposite sides of the storage compartment. Stacking said firewood pieces may comprise stacking layers atop one another with multiple rows in each layer. Where access is provided at opposite sides, different rows may be directly accessed from said opposite sides.

According to a third aspect of the invention there is provided a method of distributing firewood to consumers comprising, the method comprising:

providing a first trailer, which has a trailer structure comprising a frame having a towing end adapted for selective coupling to a tow vehicle, wheels rotatably supported on the frame to engage ground below the frame and rollably support the frame during transport, and a storage compartment carried on the frame and dimensioned to contain a predetermined volume of stacked firewood between walls positioned apart by predetermined distances suitable to maintain a stacked configuration of the firewood once stacked within the storage compartment;

loading firewood pieces into the storage compartment and stacking said firewood pieces therein to fill the storage compartment of the first trailer to a level at which the firewood pieces form the predetermined volume of stacked firewood substantially filling an area bound by the walls of the storage compartment;

towing the first trailer to a location associated with the consumer;

leaving the storage compartment of the first trailer behind at the location to allow the pieces of firewood to be removed from the storage compartment of the first trailer for consumption over time while storing remaining pieces within the storage compartment of the first trailer;

when the storage compartment of the first trailer has been emptied of all the pieces of firewood, retrieving the storage compartment of the first trailer from the location; and reloading the storage compartment of the first trailer with a refill load of firewood for subsequent delivery of the refill load of firewood in the storage compartment of the first trailer.

Preferably the first trailer is part of a fleet of trailers each having said trailer structure, and the method comprises loading a second trailer of said fleet with a replacement load of firewood, towing the second trailer and the replacement load of firewood to the location, and leaving the second trailer behind at the location during retrieval of the first trailer therefrom.

The step of leaving the storage compartment of the first trailer behind may comprises leaving the entire trailer structure of the first trailer behind.

Alternatively, the step of leaving the storage compartment of the first trailer behind comprises detaching the storage compartment from the frame, deploying the storage compartment from thereatop and departing the location with the trailer frame and wheels.

BRIEF DESCRIPTION OF THE DRAWINGS

In the accompanying drawings, which illustrate an exemplary embodiment of the present invention.

DETAILED DESCRIPTION

Figure 1:
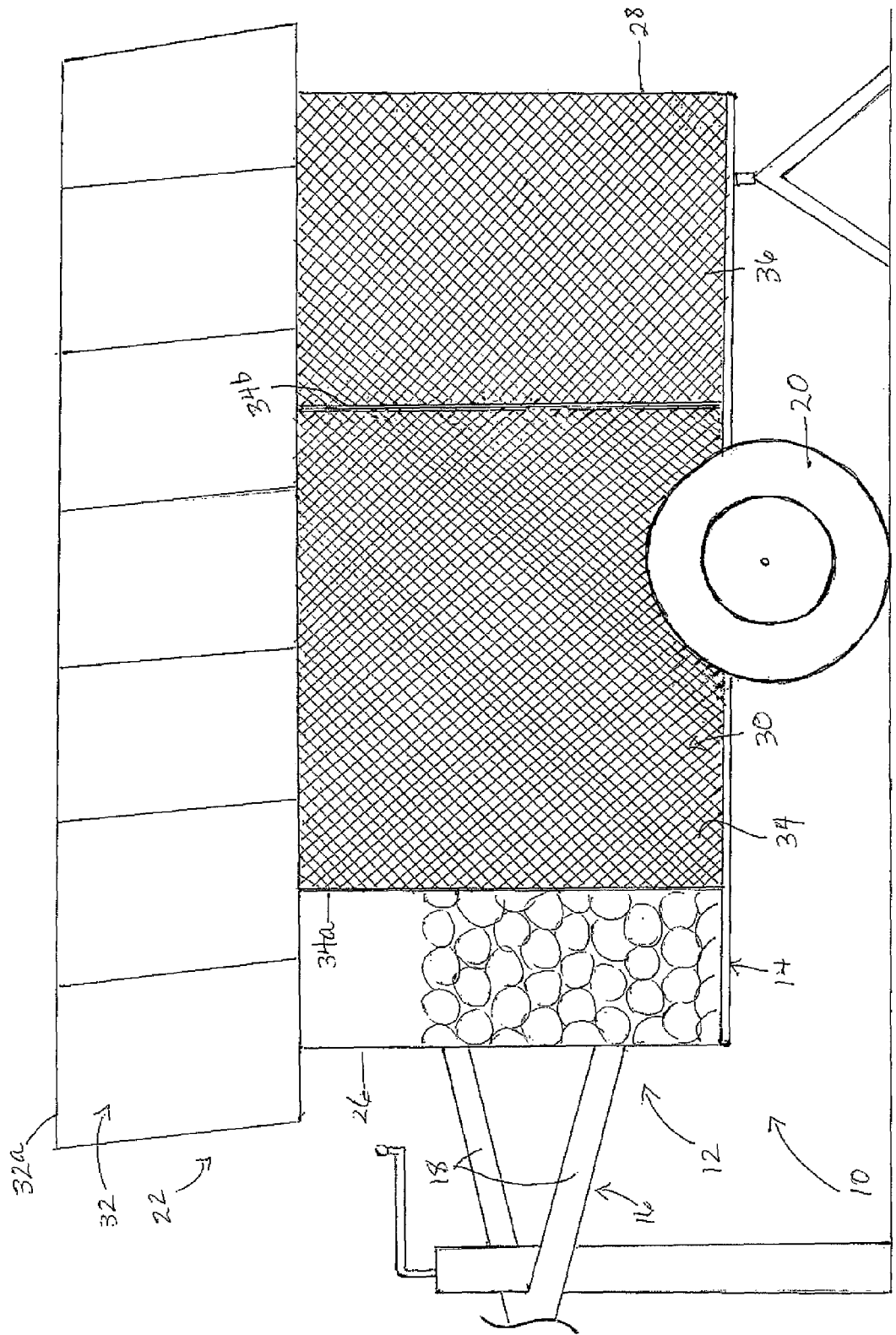
FIG. 1 is a schematic side elevational view of a firewood delivery and storage trailer of the present invention featuring an enclosable compartment having its interior space preloaded with firewood.

The appended drawings show a trailer 10 of the present invention useful for both transporting and storing firewood. The illustrated trailer includes a frame 12 of a conventional structure featuring a rectangular section 14 and an A-frame tongue section 16 projecting forwardly from a front end of the rectangular section 14. The rectangular section features a pair of parallel side rails extending along a longitudinal dimension of the trailer 10, and a series of parallel cross members extending perpendicular to the side rails at spaced positions therealong for interconnection thereof. The A-frame tongue section 16 features two non-parallel frame members 18 converging together away from the rectangular section 14 to connect with one another at an apex of the A-frame where a hitch socket or other hitch device suitable for coupling to a at a hitch ball or other hitching arrangement of a tow vehicle at a front towing end of the trailer.

A pair of wheels 20 are disposed on opposite sides of the trailer just outward from the side rails and are rotatably carried on the frame by way of an axle crossing beneath the rectangular section 14 of the frame 12 at a point between the rectangular section's front end and the trailer's rear end, which is defined by the rectangular section's rear end opposite the tongue 16. With the lowermost point of the rotational path of the periphery of each wheel tire lying a distance below the trailer frame, the tires of the wheels engage the ground below the trailer frame to rollably support the trailer in a conventional manner when coupled to a tow vehicle for transport.

Figure 2:
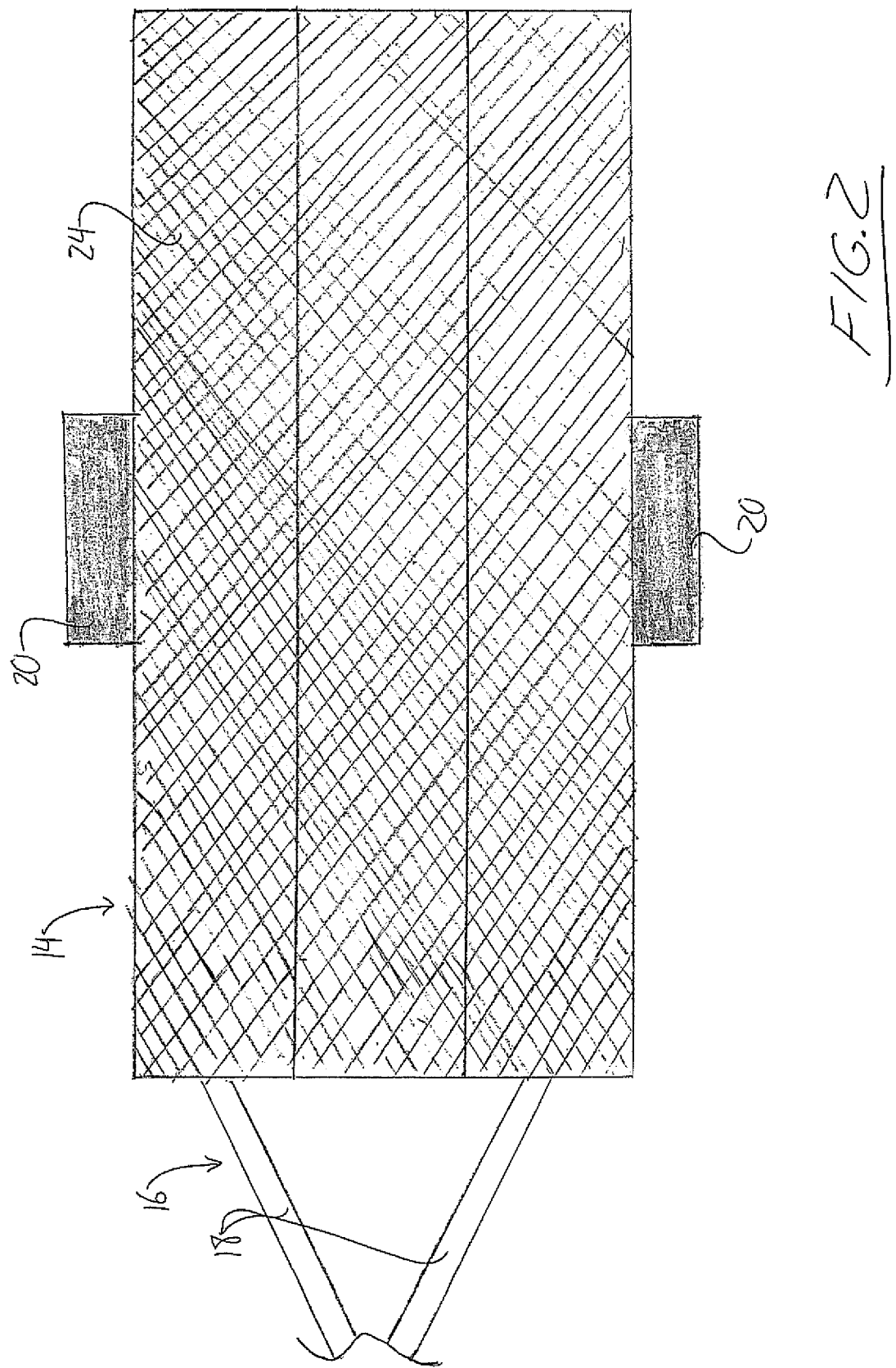
FIG. 2 is a schematic overhead plan view of the trailer of FIG. 1 with the firewood removed and wall and roof structures of the compartment omitted to show a floor structure thereof.

The uniqueness of the trailer 10 resides primarily in a shed-like storage compartment 22 defined atop the trailer frame 12 to overly the rectangular section 14 thereof. As shown in FIG. 2, a floor 24 of this storage compartment is defined one or more sheets or panels of metal mesh, screen or grating laid out and fastened atop the rectangular section 12 of the trailer frame to form a rectangular deck or floor area spanning from atop one side rail to the other and covering all, substantially all or even slightly more than the length of these side rails. At the two shorter ends of the floor 24 defined at or proximate the front and rear ends of the rectangular frame section 12, upstanding front and rear walls 26, 28 of the storage compartment extend along these end edges of the floor 24 and project perpendicularly upward therefrom. Over each of the two side rails defining the two longer sides of the rectangular frame section, a respective upstanding side wall section 30 likewise projects perpendicularly upward from the floor 24 along a respective longer side thereof. A peaked roof 32 is mounted atop the front, rear and side wall sections and features two roof sections sloping obliquely downward from a peak 32a overlying a central longitudinal axis of the trailer. Each sloped section extends outwardly past the respective side wall section 30 and past the front and rear walls to produce a roof overhang on all four sides of the rectangular storage compartment 22. The roof may be made of galvanized steel to prevent corrosion.

Each side wall section 30 features two sliding wall panels 34, 36 that are made of or include sheets of metal mesh, screen or grating. In a closed condition, the two wall panels 34, 36 are situated adjacently end-to-end or in slight overlap with one another along the respective side rail of the rectangular frame section so as to fully cover the respective side of the interior space of the storage compartment from the front wall 26 to the rear wall 28. However, as shown in FIG. 1, pulling the first wall panel 34 away from its closed position up against the front wall 26 moves the front edge 34a of the first panel 34 away from the front wall to reveal access to the interior space of the compartment ahead of the front edge 34a of the panel, while simultaneously moving the rear edge 34a of the first panel 34 rearward over the closed second panel 36 resting against the rear wall 28 to increase the overlap of the two panels along the longitudinal side of the compartment floor 24 at the side rail of the rectangular trailer section. Likewise, with the first panel 34 closed against the front wall 26, the second panel 36 is slidable out of its closed position against the rear wall 28 behind the first panel 34 to open access to the interior of the storage compartment rearward of the rear edge of the second panel.

A pair of tracks or channels are provided atop the floor over each side rail to respectively receive the first and second panels for sliding therealong one behind the other. Similar longitudinal tracking is suspended between the front and rear walls over the side rail proximate the roof in the same vertical plane as the bottom tracking on the side rail to receive and guide the top edges of the rectangular sliding panels. The upper tracking may be hidden behind the roof overhang, and thus no upper framing or track is shown over the sliding panels in FIG. 1. Such track arrangements for sliding doors or wall panels are known, and thus not described herein in further detail. In a known manner, the panels may include rollers to reduce friction between the panels and the tracks and provide a reduced-effort sliding operation. The side rail of the trailer and the track mounted or defined thereon form a bottom member of a rectangular framing structure outlining the side opening of the storage compartment, two sections of which are selectively openable and closable by movement of the respective sliding panels. Side or end members of the side framing may be provided by upright members mounted at corners of the floor, with these side or end members thus also defining side boundaries of the two end walls. Although not shown, the end walls also use metal mesh, screen or grating, and some embodiments may forgo separate wall framing members if sufficiently rigid metal or grating is used to form the end walls in entirety.

Each sliding panel has a length that is approximately half that of the respective side of the floor so as to fully close the open frame structure at this side of the compartment when in the closed positions. With neither sliding panel length significantly exceeding half of the overall side wall length, the points along the wall length at which the interior of the compartment can be easily and directly accessed through manipulation of the sliding panels is maximized for convenient loading and unloading of the trailer. With the panels forming substantially the entire side wall structure when closed, opening the panels also provides access to the storage compartment's interior space over substantially the full height of the respective side of that space. Providing access at both sides of the trailer makes the orientation of the trailer at a loading or unloading location less significant, as the storage compartment is accessible from either side. Although not shown, a selectively engagable locking or securing mechanism is provided between each sliding panel and the respective end wall or framing member against which it abuts in the closed position. Known latching, locking, securing mechanisms or releasable fasteners suitable for such purposes may be applied in the present invention to prevent the sliding panels from inadvertently opening during transport of the trailer.

In the illustrated embodiment, the rectangular volume bound by the front, rear and side wall sections of the storage compartment from the floor 24 up to the equal-height top edges of the two sliding panel side walls 30 is 8-feet long, 4-feet wide and 4-feet high. Accordingly, the interior space of the storage compartment is dimensioned to receive one cord of firewood in a stacked configuration atop the floor 24. In use, the firewood pieces are arranged with their longitudinal dimensions in the cross-wise direction of the trailer so that the pieces in each stacked layer lie beside one another in the longitudinal direction of the trailer between the front and rear walls of the storage compartment. The front and rear end walls thus maintain the stacked configuration of the cord of wood by preventing firewood pieces from rolling off the ends of the layers, thus maintaining a rectangular stack with substantially vertical ends, as shown at the front wall 26 of the compartment in FIG. 1. As illustrated by FIG. 2, firewood to be stacked in the trailer can be precut into equal 16-inch lengths and stacked in layers of three rows each. Two outer rows in each layer sit adjacent the opposite longitudinal sides of the storage compartment, with a center row between them. Clean, easy stacking can be obtained by accessing the middle section of the floor from either side and then accessing the two side sections of the floor from the respective sides of the trailer. Convenient unloading of firewood from the trailer likewise benefits from direct, easy access to the outer rows from the respective opposite sides of the trailer.

The use of mesh, screen or grating in the wall structures over substantially the entire surface area at each side of the compartment provides arrays of airflow openings to allow air to readily circulate and pass through the compartment. Accordingly, freshly cut wood loaded into the trailer is allowed to dry therein whether being stored or transported. The roof and overhang protects the wood from exposure to rain, snow, sleet or hail to limit detriment to the drying process or dry status of wood in the compartment. The use of the mesh, grating or screen to form each panel or wall in entirety, or to at least form the vast majority of the panel or wall between peripheral framing members surrounding the mesh, grating or screen, means that the array of airflow openings span the full or substantially full length and height of each panel or wall to maximize airflow into and out of the compartment and provide equal air exposure to firewood pieces at all locations along each wall. The airflow openings in the mesh, screen or grate floor likewise maximize exposure of the bottom layer of stacked firewood to outside air.

The foregoing trailer can be used in a distribution system and process of the present invention. A wood delivery company, operator or agent can maintain a fleet of trailers of the type described above for use in delivery of firewood to consumers. A consumer calls, emails or otherwise contacts the delivery company to place an order for a cord of firewood to be delivered to a location specified by the consumer. A trailer is loaded with a cord of firewood and then hooked up to a suitable tow vehicle with the sliding access doors secured in the closed positions to prevent any of the stacked firewood from falling from the storage compartment of off the trailer during transport. The pre-loaded trailer is then delivered to the requested location associated with the customer. If the consumer or other recipient is on site during delivery, they may specify a particular area or position at the location where the trailer is to be placed. The tow vehicle departs the delivery location, leaving the trailer behind for use of the storage compartment containing the firewood as a storage shed from which the consumer or other authorized/designated party can retrieve firewood pieces on an as-needed basis for consumption in a fireplace, wood stove or fire pit. The consumer recognizes that the filled cord-sized storage compartment contains an accurately measured cord of wood and does not need to worry about providing a dry secure storage shed or other structure or area for storing the wood. The individual deliveries are cost and time effective for the delivery company, as no labour is required for unloading the delivered wood.

The delivered trailer may include locks for the sliding panels, with the delivery recipient also receiving a key, combination or other unlocking device or authorization to allow the recipient to use the same lock to prevent firewood theft from the trailer while on-site at the consumer-specified location. Alternatively, the trailer may be equipped to use a conventional padlock for selective locking of the sliding panels in the closed positions so that the recipient can use their own lock if secured storage is required.

Once the storage compartment has been emptied of firewood after being left on-site at the delivery location for gradual consumption of the wood over time, the consumer places another order for a new cord of wood. If not done already, the delivery company loads another trailer with a replacement cord of firewood and tows it to the same consumer specified location. This time, the second trailer is left behind at the consumer specified location and the empty first trailer is towed away, for example to a trailer storage yard of the delivery company or to a firewood loading site. Replacing the empty first trailer with the full second trailer leaves the consumer with a fresh cord of wood for another term of gradual consumption from the storage/delivery trailer. During the trailer exchange at the consumer specified location, the delivery service may perform a cleanup of any debris left behind at the previous site of the first trailer as part of the delivery/retrieval service. The company can thus offer a full service business model leaving the firewood consumer free of any worries or responsibility over transport, storage, order size accuracy, and cleanup. Having been retrieved, the first trailer can be refilled with a fresh cord of wood for delivery of this new supply to another customer.

The invention can be used to provide one cord (4 feet/4 feet/8 feet) of clean seasoned wood cut to firewood lengths, split, dried, and piled on a trailer with a roof to protect it from the weather and wire mesh screen on the sides with a lockable door made of the same material. This unit can be parked conveniently in a customer's yard to replace the conventional need for a wood shed. The wood sheds of past years didn't only protect the wood, but have been home to rodents, insects and/or stray cats or dogs in the neighborhood. They have also been collectors of wood chips and bark, resulting in a notable a fire hazard even when emptied of firewood. The trailer can be picked up and removed when empty, along with any mess left on the ground by bark, chips and debris having fallen through the mesh floor, and replaced with a fresh trailer.

The forgoing ideas solve many problems for the user: The size of the trailer solves the problem of how much wood there is, as the dimensions of the wood pile filling the storage compartment are exact. It has a roof to keep the wood dry and ready to burn and replaces the conventional wood shed. It can be parked in a convenient location without dumping the ordered wood supply on the ground for the customer to deal with. The customer doesn't have to handle the wood until he or she is ready to use it. When the trailer is empty, a simple phone call is all that is needed for the trailer and any debris on the ground to be picked up, and a fresh trailer delivered. The system cuts down on the labor of handling the wood, which can cut down on the end cost to the customer, and may be aimed at a large volume operation, which can again cut down on the cost.

The trailer can be produced with a low profile with wall sections framed in a light-weight angle iron covered with light-weight screen mesh, and with a light-weight roof. In one embodiment, a one-cord trailer may have a height of 7-feet from the ground to the peak of the roof, a length of 12-feet from the bumper to the hitch and a width of 5-feet from side to side. As shown in FIG. 1, a trailer tongue jack stand may be used to maintain the trailer frame in a stable, level horizontal position when being used as a temporary storage shed at the consumer site.

Although the illustrated trailer is described as dimensioned to accommodate and be substantially filled by a single cord of firewood, it will be appreciated that the dimensions and volume of the storage compartment may be altered to correspond to a different predetermined volume of firewood. The compartment may be selectively filled to different levels according to a particular order size requested by the consumer up to a maximum size the trailer is able to accommodate. For example, height markings on the compartment walls may be used to mark of different levels according to different fractions of a full trailer load. For example, a one-cord trailer may still be used to deliver a half-cord or other fractional load of firewood. Alternatively, larger trailers can of course be produced to handle more than a single cord of wood, for example including two and three cord trailer models intended to accommodate up to two and three cord loads respectively.

While the illustrated embodiment provides access to the storage compartment at two longitudinal sides of the trailer, another embodiment may have a closable access opening at the rear end of the trailer. However, with access over the full length of each side of the trailer, the consumer may never need to climb into the trailer to retrieve firewood, likely reducing physical effort and chances of injury. While the wall and floor structures of the illustrated embodiment are described as featuring metal mesh, screen or grating, other materials of suitable rigidity and strength may be used, as could other structural configurations likewise providing an array of airflow openings over the surface area of the walls and floor, such as perforated metal sheets. While use of such structure on all sides of the interior space (except the roof) maximizes airflow, some embodiments may include more impervious structures on one or more sides.

In another embodiment, the storage compartment or shed of the trailer may be of a removable configuration that is selectively separable from the trailer frame instead of permanently mounted thereon. Accordingly, the storage compartment can be loaded with firewood for a delivery trip either before or after the storage compartment is releasably mounted onto the trailer frame in a secured manner, so that the trailer can then be used to transport the firewood to a delivery site specified by the customer where the loaded storage compartment can be unloaded from the trailer frame and left behind on its own. In such an embodiment, the trailer frame and wheels are not left to sit and bear the weight of firewood over the time it takes to consume the load. The trailer frame can be stored off site by the owner/operator or used during this period to transport other storage compartments, firewood loads or other loads requiring trailer-top transport. In such an embodiment, an owner/operator having only a single wheel-carried trailer frame, but multiple "shed" or storage compartments can still operate a firewood delivery operation capable of serving multiple customers or sites. The same owner/operator can grow his/her business by adding additional trailers to form a fleet, with a greater number of shed-like storage compartments than trailers.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A firewood distribution method comprising:
providing a first trailer, which has a trailer structure comprising a frame having a towing end adapted for selective coupling to a tow vehicle, wheels rotatably supported on the frame to engage ground below the frame and rollably support the frame during transport, and a storage compartment carried on the frame and dimensioned to contain a predetermined volume of stacked firewood between walls positioned apart by predetermined distances suitable to maintain a stacked configuration of the firewood once stacked within the storage compartment, the storage compartment comprising a floor extending along the frame, a front wall section projecting upward along a front end of the floor nearest the towing end of the frame, a rear wall section projecting upward along a rear end of the floor opposite the towing end of the frame, side wall sections extending between the front and rear wall sections along opposite sides of the floor, and a roof mounted over the wall sections to cover an interior space of the storage compartment over the floor between the wall sections, at least one of the wall sections comprising an access portion spanning from adjacent the floor to adjacent the roof and movable between open and closed positions to selectively open and close off access to the interior space at said at least one of the wall sections, and an array of airflow openings are provided in each wall section of at least one pair of opposing ones of the wall sections facing one another across the interior space of the storage compartment, each array of airflow openings comprising openings spaced along both a height and a length of said respective wall section;
loading firewood pieces into the storage compartment and stacking said firewood pieces therein to fill the storage compartment of the first trailer to a level at which the firewood pieces form the predetermined volume of stacked firewood substantially filling an area bound by the wall sections of the storage compartment;
towing the first trailer to a location associated with a consumer;
leaving the storage compartment of the first trailer behind at the location to allow the pieces of firewood to be removed from the storage compartment of the first trailer for consumption over time while storing remaining pieces within the storage compartment of the first trailer;
when the storage compartment of the first trailer has been emptied of all the pieces of firewood, retrieving the storage compartment of the first trailer from the location; and
reloading the storage compartment of the first trailer with a refill load of firewood for subsequent delivery of the refill load of firewood in the storage compartment of the first trailer.

2. The method of claim 1 wherein the storage compartment of the trailer structure comprises an additional array of airflow openings provided in the floor and spanning substantially from the front wall section to the rear wall section and substantially across the floor from one side wall section to the other.

3. The method of claim 1 firewood trailer of claim 1 wherein the at least one pair of opposing wall sections of the storage compartment in which the array of airflow openings are provided comprises a first pair including the front and rear wall sections and a second pair including the side wall sections.

4. The method of claim 1 wherein the roof of the storage compartment of the trailer structure comprises at least one non-horizontal section sloping downward moving outward relative to the interior space of the storage compartment.

5. The method of claim 1 wherein the access portion of the storage compartment comprises a sliding wall portion slidable along a respective side of the interior space of the storage compartment between the open and closed positions to respectively reveal and cover an access opening at the respective side.

6. The method of claim 1 wherein the access portion of the storage compartment comprises a series of sliding wall panels situated along a side of the interior space of the storage compartment and in which each sliding panel is slidable out of the closed position along an adjacent panel to increase an overlap of a first end of said panel with the adjacent panel to open the access to the interior space at a second end of said panel opposite the first end.

7. The method of claim 6 wherein the series of sliding wall panels fully span the side of the interior space of the storage compartment when in the closed position.

8. The method of claim 1 wherein each side wall section of the storage compartment has a respective said access portion.

9. The method of claim 1 where a floor area of the interior space of the storage compartment spanning fully between the front and rear and side wall sections is rectangular and measures approximately 8 feet by 4 feet.

10. The method of claim 9 wherein a height of the interior space of the storage compartment is at least 4 feet.

11. The method of claim 1 wherein the first trailer is part of a fleet of trailers each having said trailer structure, and the method comprises loading a second trailer of said fleet with a replacement load of firewood, towing the second trailer and the replacement load of firewood to the location, and leaving the second trailer behind at the location during retrieval of the first trailer therefrom.

12. The method of claim 1 wherein the predetermined volume of stacked firewood is a cord of firewood.

13. The method of claim 1 wherein the step of leaving the storage compartment of the first trailer behind comprises leaving the entire trailer structure of the first trailer behind.

14. A firewood distribution preparation method for preparing firewood for distribution to a customer location, the method comprising:

providing a firewood trailer comprising a frame having a towing end adapted for selective coupling to a towing vehicle, wheels rotatably supported on the frame to engage ground below the frame and rollably support the frame during transport, and a storage compartment carried on the frame and dimensioned to contain a predetermined volume of stacked firewood between walls positioned apart by predetermined distances suitable to maintain a stacked configuration of the firewood once stacked within the storage compartment, the storage compartment comprising a floor extending along the frame, a front wall section projecting upward along a front end of the floor nearest the towing end of the frame, a rear wall section projecting upward along a rear end of the floor opposite the towing end of the frame, side wall sections extending between the front and rear wall sections along opposite sides of the floor, and a roof mounted over the wall sections to cover an interior space of the storage compartment over the floor between the wall sections, at least one of the wall sections comprising an access portion spanning from adjacent the floor to adjacent the roof and movable between open and closed positions to selectively open and close off access to the interior space at said at least one of the wall sections, and an array of airflow openings are provided in each wall section of at least one pair of opposing ones of the wall sections facing one another across the interior space of the storage compartment, each array of airflow openings comprising openings spaced along both a height and a length of said respective wall section; and loading firewood pieces into the storage compartment and stacking said firewood pieces therein to fill the storage compartment to a level at which the firewood pieces form the predetermined volume of stacked firewood substantially filling an area bound by the wall sections of the storage compartment.

15. The firewood distribution preparation method of claim 14 comprising allowing air to flow through the array of airflow openings to aid in drying of the firewood pieces stacked therein.

16. The firewood distribution preparation method of claim 14 wherein the step of stacking said firewood pieces comprises stacking layers atop one another with multiple rows in each layer, and the storage compartment of the firewood trailer has access portions at both side wall sections for access to different rows from said side wall sections.

17. The method of claim 1 wherein the step of leaving the storage compartment of the first trailer behind comprises detaching the storage compartment from the frame, deploying the storage compartment from atop of the frame and departing the location with the trailer frame and wheels.

* * * * *